US010565130B2

(12) United States Patent
Chhabra et al.

(10) Patent No.: US 10,565,130 B2
(45) Date of Patent: Feb. 18, 2020

(54) TECHNOLOGIES FOR A MEMORY ENCRYPTION ENGINE FOR MULTIPLE PROCESSOR USAGES

(71) Applicant: Intel Corporation, Santa Clara, CA (US)

(72) Inventors: Siddhartha Chhabra, Portland, OR (US); Reouven Elbaz, Hillsboro, OR (US); Krishnakumar Narasimhan, Beaverton, OR (US); Prashant Dewan, Portland, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 129 days.

(21) Appl. No.: 15/714,323

(22) Filed: Sep. 25, 2017

(65) Prior Publication Data

US 2019/0095351 A1    Mar. 28, 2019

(51) Int. Cl.
| | |
|---|---|
| *G06F 12/14* | (2006.01) |
| *H04L 9/32* | (2006.01) |
| *G06F 21/72* | (2013.01) |
| *G06F 21/79* | (2013.01) |
| *G06F 21/85* | (2013.01) |

(52) U.S. Cl.
CPC .......... *G06F 12/1408* (2013.01); *G06F 21/72* (2013.01); *G06F 21/79* (2013.01); *G06F 21/85* (2013.01); *H04L 9/3242* (2013.01)

(58) Field of Classification Search
CPC ...... G06F 12/1408; G06F 21/72; G06F 21/79; G06F 21/85; H04L 9/3242
See application file for complete search history.

(56) References Cited

U.S. PATENT DOCUMENTS

| | | | | |
|---|---|---|---|---|
| 9,442,752 B1* | 9/2016 | Roth | .................. | G06F 9/45558 |
| 9,448,950 B2* | 9/2016 | Scarlata | ............. | G06F 12/1466 |
| 9,734,054 B1* | 8/2017 | Sutera | ...................... | G11C 8/04 |
| 2005/0071651 A1* | 3/2005 | Aguilar, Jr. | ........... | G06F 21/602 |
| | | | | 713/189 |
| 2010/0281273 A1* | 11/2010 | Lee | ......................... | G06F 21/72 |
| | | | | 713/190 |
| 2013/0067245 A1* | 3/2013 | Horovitz | ............. | G06F 12/1408 |
| | | | | 713/193 |
| 2017/0177396 A1* | 6/2017 | Palermo | ............. | G06F 9/45558 |
| 2017/0277898 A1* | 9/2017 | Powell | .................. | G06F 21/602 |

* cited by examiner

*Primary Examiner* — Mohammad A Siddiqi
(74) *Attorney, Agent, or Firm* — Barnes & Thornburg LLP

(57) ABSTRACT

Technologies for secure memory usage include a computing device having a processor that includes a memory encryption engine and a memory device coupled to the processor. The processor supports multiple processor usages, such as secure enclaves, system management firmware, and a virtual machine monitor. The memory encryption engine is configured to protect a memory region stored in the memory device for a processor usage. The memory encryption engine restricts access to one or more configuration registers to a trusted code base of the processor usage. The processor executes the processor usage and the memory encryption engine protects contents of the memory region during execution. The memory encryption engine may access integrity metadata based on the address of the protected memory region. The memory encryption engine may prepare top-level counter metadata for entering a low-power state. Other embodiments are described and claimed.

22 Claims, 4 Drawing Sheets

US 10,565,130 B2

TECHNOLOGIES FOR A MEMORY ENCRYPTION ENGINE FOR MULTIPLE PROCESSOR USAGES

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. A hardware memory encryption engine (MEE) in the processor may provide data confidentiality, integrity, and replay protection for data protected by SGX.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
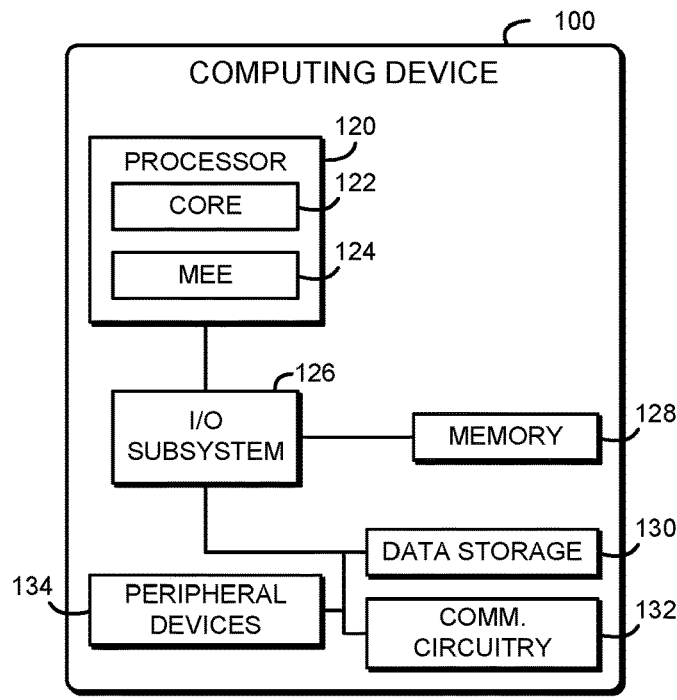
FIG. 1 is a simplified block diagram of at least one embodiment of a computing device with a memory encryption engine for multiple processor usages.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for a memory encryption engine for multiple processor usage includes, among other components, a processor 120 that includes a memory encryption engine (MEE) 124. The processor 120 supports multiple processor usages, such as SGX secure enclaves, system management mode (SMM) firmware, virtual machine monitor (VMM), hypervisor, or other virtualization root mode, and/or other usages. In use, the computing device 100 configures the MEE 124 to protect a memory region for each processor usage, for example by setting one or more configuration registers. The MEE 124 controls access to each configuration register according to the trusted code base (TCB) of the associated processor usage. While executing each processor usage, the MEE 124 provides confidentiality, integrity, and replay protection for the protected memory region associated with each processor usage. The MEE 124 may generate integrity metadata addresses based on the addresses of data in the protected memory region. The MEE 124 may support saving and restoring the integrity metadata, allowing the protected memory regions to survive entering and exiting low-power states such as S3 sleep. Thus, the computing device 100 may provide protected memory regions to multiple mutually untrusting processor usages at the same time. By sharing the same MEE 124, memory protection may be provided without requiring on-die encryption or other resources for each usage. Thus, the computing device 100 may provide improved security without requiring additional hardware cost and/or complexity. Also, because the protected memory regions may survive through a low-power state, long-lived or system data structures may be stored in protected memory and/or power efficiency of the computing device 100 may be improved.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 126, a memory 128, a data storage device 130, and communication circuitry 132. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 128, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 includes a processor core 122 and a memory encryption engine (MEE) 124. The processor core 122 is an independent, general-purpose processing unit capable of executing programmed instructions. For example, the processor core 122 may execute instructions from a general-purpose instruction set architecture (ISA) such as IA-32 or Intel® 64. The illustrative processor 120 is a single-core processor 120 having one processor core 122; however, it should be understood that in other embodiments the processor 120 may be embodied as a multi-core or multi-threaded processor, digital signal processor, microcontroller, or other processor or processing/controlling circuit with multiple processor cores or other independent processing units.

The MEE 124 may be embodied as any logic, functional block, integrated circuit, or other circuitry capable of providing confidentiality, integrity, and replay protection for protected memory regions as described herein. The MEE 124 may be coupled to a memory fabric, memory controller, system agent, and/or other memory subsystem of the processor 120. As described further below, the MEE 124 may encrypt data written by the core 122 to and/or decrypt data read by the core 122 from one or more protected memory regions in the memory 128. As described further below, MEE 124 supports multiple processor usages of the processor 120.

The memory 128 may be embodied as any type of volatile or non-volatile memory or data storage capable of performing the functions described herein. In operation, the memory 128 may store various data and software used during operation of the computing device 100 such as operating systems, applications, programs, libraries, and drivers. The memory 128 is communicatively coupled to the processor 120 via the I/O subsystem 126, which may be embodied as circuitry and/or components to facilitate input/output operations with the processor 120, the memory 128, and other components of the computing device 100. For example, the I/O subsystem 126 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may form a portion of a system-on-a-chip (SoC) and be incorporated, along with the processor 120, the memory 128, and other components of the computing device 100, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. In some embodiments, the data storage device 130 may be used to store the contents of one or more secure enclaves. When stored by the data storage device 130, the contents of the secure enclave may be encrypted to prevent unauthorized access.

The communication circuitry 132 of the computing device 100 may be embodied as any communication circuit, device, or collection thereof, capable of enabling communications between the computing device 100 and other remote devices over a network. The communication circuitry 132 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may further include one or more peripheral devices 134. The peripheral devices 134 may include any number of additional input/output devices, interface devices, and/or other peripheral devices. For example, in some embodiments, the peripheral devices 134 may include a touch screen, graphics circuitry, an audio device, a microphone, a camera, an environmental sensor, a keyboard, a mouse, and/or other input/output devices, interface devices, and/or peripheral devices.

Figure 2:
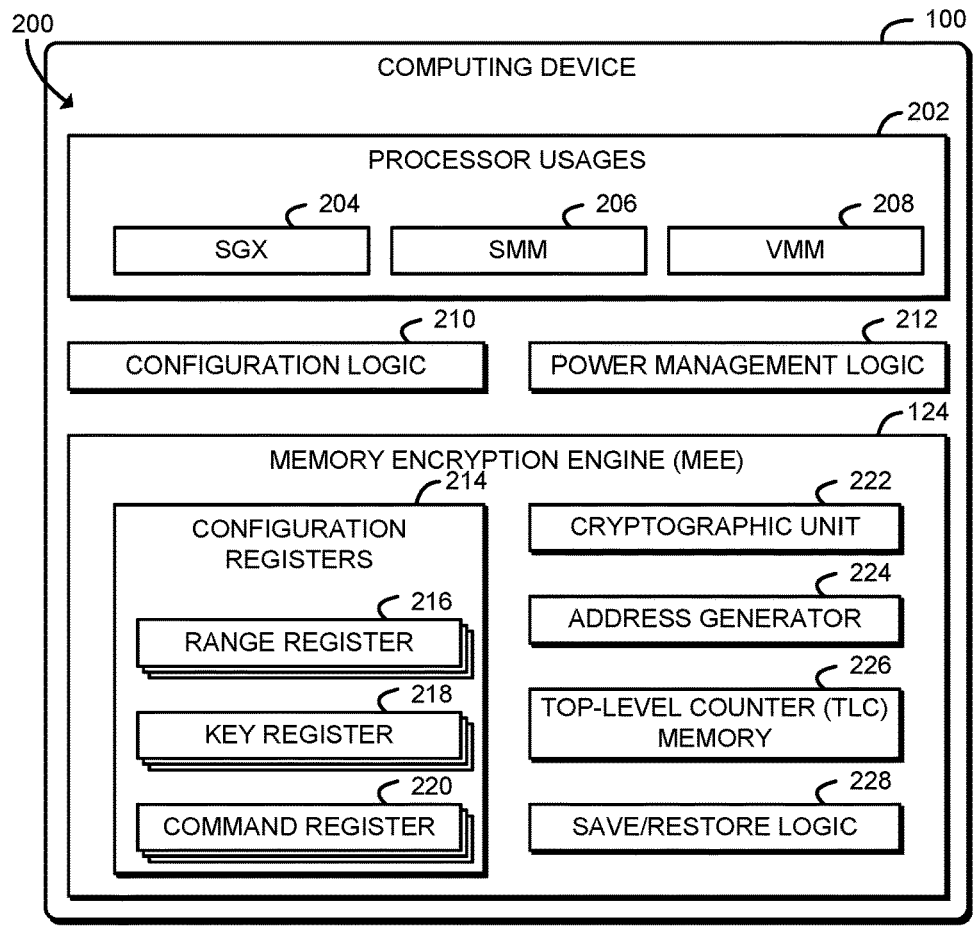
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes multiple processor usages 202 supported by the processor 120, configuration logic 210, power management logic 212, and the memory encryption engine 124. The various components of the environment 200 may be embodied as hardware, firmware, microcode, software, or a combination thereof. As such, in some embodiments, one or more of the components of the environment 200 may be embodied as circuitry or collection of electrical devices (e.g., processor usage circuitry 202, configuration logic circuitry 210, power management logic circuitry 212, and/or memory encryption engine circuitry 124). It should be appreciated that, in such embodiments, one or more of the processor usage circuitry 202, the configuration logic circuitry 210, the power management logic circuitry 212, and/or the memory encryption engine circuitry 124 may form a portion of one or more of the processor 120, the I/O subsystem 126, and/or other components of the computing device 100. Additionally, in some embodiments, one or more of the illustrative components may form a portion of another component and/or one or more of the illustrative components may be independent of one another.

The processor 120 is configured to support multiple processor usages 202, which may be embodied as processor modes, personas, initiators, or other entities supported by the processor 120. Each processor usage 202 may be associated with a particular trusted code base, for example by one or more security policies of the computing device 100. As shown, the processor usages 202 illustratively include an SGX secure enclave 204, system management mode (SMM) 206, and a virtual machine monitor (VMM) 208.

As shown in FIG. 2, the MEE 124 may include or otherwise establish multiple configuration registers 214, including range registers 216, key registers 218, and command registers 220. Each processor usage 202 may be associated with a particular set of configuration registers 214. The illustrative MEE 124 further includes a cryptographic unit 222, an address generator 224, top-level counter (TLC) memory 226, and save/restore logic 228. Of course, in some embodiments, the MEE 124 may include one or more additional components, such as an MEE cache to store cached metadata, an MEE tracker to coordinate protected memory data accesses and metadata accesses, an MEE arbiter to control access to the memory controller, one or more power gating state machines, and/or other components.

The configuration logic 210 is configured to configure the MEE 124 to protect a memory region stored in the memory 128 for each of one or more of the processor usages 202. Configuring the MEE 124 may include writing configuration values to the configuration registers 214 of the MEE 124. As described above, each configuration register 214 is associated with the particular processor usage 202 being configured. The MEE 124 is configured to restrict access to each configuration register 214 to a trusted code base (TCB) of the associated processor usage 202. For example, the MEE 124 may restrict access to the configuration registers 214 associated with the SGX secure enclave usage 204 to microcode of the processor 120, restrict access to the configuration registers 214 associated with the SMM usage 206 to firmware executed by the processor 120, and restrict access to the configuration registers 214 associated with the VMM usage 208 to the VMX-root mode of the processor 120.

After configuring the MEE 124, the processor 120 is configured to execute the particular processor usage 202. The MEE 124 is configured to protect the contents (e.g., data) of the protected memory region during execution of the processor usage 202. Protecting the contents may include intercepting memory requests from the processor usage 202 to addresses in the protected memory region and verifying encrypted data at those addresses using integrity tree metadata. For example, for read requests the MEE 124 may decrypt and verify the encrypted data at the memory address. As another example, for write requests, the MEE 124 may preemptively verify encrypted data at the memory address, encrypt plaint text data to generate updated encrypted data, write the updated encrypted data at the memory address, and update the integrity tree metadata based on the updated encrypted data. The MEE 124 may be further configured to select multiple metadata bits from each address in the protected memory region and index a metadata memory region with the metadata bits to retrieve and/or store the corresponding integrity tree metadata.

The TLC memory 226 includes one or more root nodes or other top-level counters of an integrity tree used to provide integrity and replay protection for the protected memory region. The TLC memory 226 may be embodied as, for example, on-die SRAM included in the MEE 124. A single TLC memory 226 device may include distinct TLC data for each usage 202. The MEE 124 may be further configured to write the contents of the TLC memory 226 to the memory 128, compute a running hash value of the contents of the TLC memory 226, and then hold the running hash value in an always-on power domain of the MEE 124; The power management logic 212 is configured to enter a low-power state in response to holding the running hash value in the always-on power domain.

The power management logic 212 is further configured to exit the low-power state. The MEE 124 may be further configured to read the contents of the TLC memory 226 memory from the memory 128 in response to exiting the low-power state, compute a computed hash value of the contents of the TLC memory 226 as it is read, and then determine whether the computed hash value matches the hash value previously stored in the always-on power domain. The MEE 124 may generate a security exception if hash values do not match.

Figure 3:
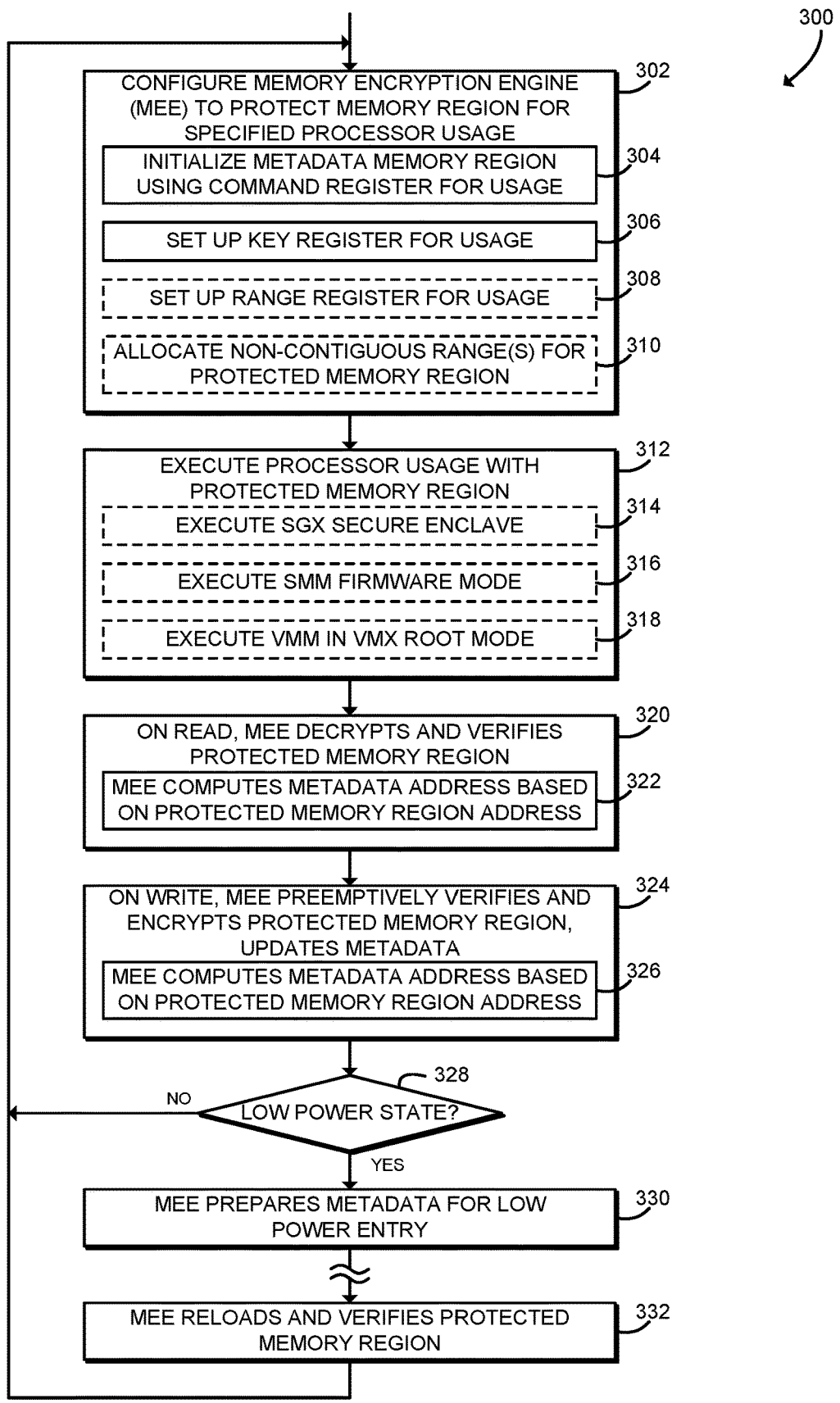
FIG. 3 is a simplified flow diagram of at least one embodiment of a method for cryptographically protected memory for multiple processor usages that may be executed by the computing device of FIGS. 1-2.

Referring now to FIG. 3, in use, the computing device 100 may execute a method 300 for cryptographic protected memory for multiple processor usages. It should be appreciated that, in some embodiments, the operations of the method 300 may be performed by one or more components of the environment 200 of the computing device 100 as shown in FIG. 2. The method 300 begins with block 302, in which the computing device 100 configures the MEE 124 to protect one or more memory regions for a particular processor usage 202. The computing device 100 may configure the MEE 124 by setting one or more configuration registers 214 of the MEE 124 with appropriate values.

In block 304, the processor 120 may initialize a metadata region in the memory 128 using a command register 220 associated with the processor usage 202. The MEE 124 uses an integrity tree to provide integrity and replay protection for data stored in the protected memory region. Illustratively, the integrity tree includes message authentication code (MAC) nodes, version nodes, intermediate metadata nodes, and top-level counters (TLCs). A per-line MAC value is associated with each cache line of data (data line) in a protected memory region. Each time a cache line is written back to the memory 128, the associated MAC is updated to reflect the most recent (encrypted) data stored in the memory 128. When the data line is read from the memory 128, the MEE 124 also verifies the associated MAC, protecting against modification attacks on the data line while it was resident in the memory 128, which may provide integrity protection to the protected memory region.

The version nodes hold the version of a data line, which is incremented each time the data line is written back to the memory 128. An intermediate metadata node in the integrity tree includes consists of counter values and an embedded MAC, computed over the counters stored in the metadata node. As an input to the embedded MAC, a counter from the next-higher level in the integrity tree is used. This process continues up to the root counters (TLCs), which are stored securely on the MEE 124 in the TLC memory 226 (e.g., on-die SRAM). In use, the TLCs are not evicted off the processor 120 chip and thus provide protection against attacks. The counters at each level in the integrity tree act as versions for the next-lower level, ending with the version nodes storing the versions for the data lines. Therefore, on a write to a data line, all counters (including the version) and associated embedded MACs along the data line's branches must be updated to ensure that the counters along the integrity tree branch now reflect this update. In order to ensure replay-protection, each time a data line is loaded from the protected region it is verified for authenticity against the tree nodes up to the root (TLCs). A mismatch at any level indicates a potential attack and raises a security exception, thereby defeating the attack.

In order to prevent false integrity failures (which may result in a system reset), the TLCs are initialized to a predetermined initialized state on reset time, and the tree walk process when finding a TLC in the initialized state may the integrity checks. A processor usage 202 may store initialization commands in the command register 220 in order to initialize the TLCs and other integrity tree nodes for the protected memory region. Each processor usage 202 has an associated command register 220, and the MEE 124 may restrict access to the command register 220 to entities within the trusted code base (TCB) of the associated processor usage 202. One potential embodiment of a method for controlling access to the command registers 220 is described below in connection with FIG. 4.

In block 306, the computing device 100 may set up one or more key registers 218 associated with the processor usage 202. The key registers 218 include one or more encryption keys used to encrypt data stored in the protected memory region. Similar to the command registers 220, each processor usage 202 has one or more associated key registers 218, and the MEE 124 may restrict access to each the key register 218 to entities within the trusted code base (TCB) of the associated processor usage 202. One potential embodiment of a method for controlling access to the key registers 218 is described below in connection with FIG. 4.

In some embodiments, in block 308, the computing device 100 may set up one or more range registers 216 associated with the processor usage 202. The range registers 216 may be used to identify a contiguous memory range to be used as the protected memory region. For example, the SGX usage 204 may set one or more processor reserved memory range registers (PRMRR) or the SMM usage 206 may set a system management range register (SMRR). Each processor usage 202 that uses a contiguous memory range may have one or more associated range registers 216, and the MEE 124 may restrict access to each range register 216 to entities within the trusted code base (TCB) of the associated processor usage 202. The MEE 124 may use the range registers 216 to disambiguate memory requests belonging to different ranges. Processor usages 202 that do not use contiguous memory ranges (e.g., the VMM usage 208) may not use any range registers 216. One potential embodiment of a method for controlling access to the range registers 216 is described below in connection with FIG. 4.

In some embodiments, in block 310 the computing device 100 may allocate one or more non-contiguous range(s) in the memory 128 for the protected memory region. For example, for the VMM usage 208, the VMM may allocate one or more non-contiguous ranges to store critical system data or other protected data. The computing device 100 may allocate the non-contiguous ranges in certain fixed but discontinuous memory locations to support integrity metadata address generation performed by the MEE 124. One potential embodiment of a method for integrity metadata address generation is described below in connection with FIG. 5.

In block 312, the computing device 100 executes the processor usage 202 with the protected memory region. During execution, the MEE 124 provides confidentiality, integrity, and replay protection for data stored by the processor usage 202 in the protected memory region. In some embodiments, in block 314 the computing device 100 may execute an SGX secure enclave or other secure enclave usage 204. In some embodiments, in block 316 the computing device 100 may execute the SMM usage 206 in SMM firmware mode or other system management firmware usage. In some embodiments, in block 318, the computing device 100 may execute the VMM usage 208 in VMX root mode or other virtualization root usage.

In block 320, on a read from the protected memory region, the MEE 124 decrypts encrypted data from the memory 128 and verifies the integrity of the protected memory region. To perform integrity protection, in block 322 the MEE 124 computes a metadata address based on the address of data read from the protected memory region. One potential embodiment of a method for computing the metadata address is described further below in connection with FIG. 5. The metadata address is used to read integrity tree metadata from the memory 128 (e.g., MAC nodes, version nodes, intermediate and/or metadata nodes). The integrity tree metadata is checked against to the top-level counter metadata stored in the TLC memory 226 of the MEE 124 to verify the integrity of the data. If the integrity check fails, the MEE 124 may generate a security exception.

In block 324, on a write to the protected memory region, the MEE 124 preemptively verifies the integrity of the protected memory region, encrypts plain text data to be stored in the memory 128, and updates the integrity tree metadata based on the updated encrypted data. To perform the integrity protection and to update the integrity tree metadata, in block 326 the MEE 124 computes a metadata address based on the address at which data is to be written to the protected memory region. One potential embodiment of a method for computing the metadata address is described further below in connection with FIG. 5.

In block 328, the computing device 100 determines whether to enter a low power state, such as an S3 sleep state. The computing device 100 may determine whether to enter the low power state based on one or more operating system power policies or other criteria. If the computing device 100 determines not to enter the low-power state, the method 300 loops back to block 302, in which the computing device 100 may configure the MEE 124 to protect memory regions for additional processor usages 202 and/or continue to execute the current processor usage(s) 202. If the computing device 100 determines to enter the low-power state, the method 300 advances to block 330.

In block 330, the MEE 124 prepares the integrity metadata entry to the low-power mode. For example, the MEE 124 may generate a hash over the TLC memory 226 and flush the TLC memory 226 to the memory 128. After preparing the metadata, the TLC memory 226 may be powered down, which may provide substantial power saving as described further below. One potential embodiment of a method for preparing the metadata is described further below in connection with FIG. 6.

After preparing the metadata, the computing device 100 enters the low power state (e.g., S3 sleep) and remains in the low power state until receiving a wake event or otherwise exiting the low power state. In response to exiting the low power state, in block 332, the MEE 124 reloads and verifies the contents of the protected memory region. In particular, the MEE 124 may reload and verify the contents of the TLC memory 226. After loading and verifying the protected memory region, the method 300 loops back to block 302, in which the computing device 100 may configure the MEE 124 to protect memory regions for additional processor usages 202 and/or continue to execute the current processor usage(s) 202.

Figure 4:
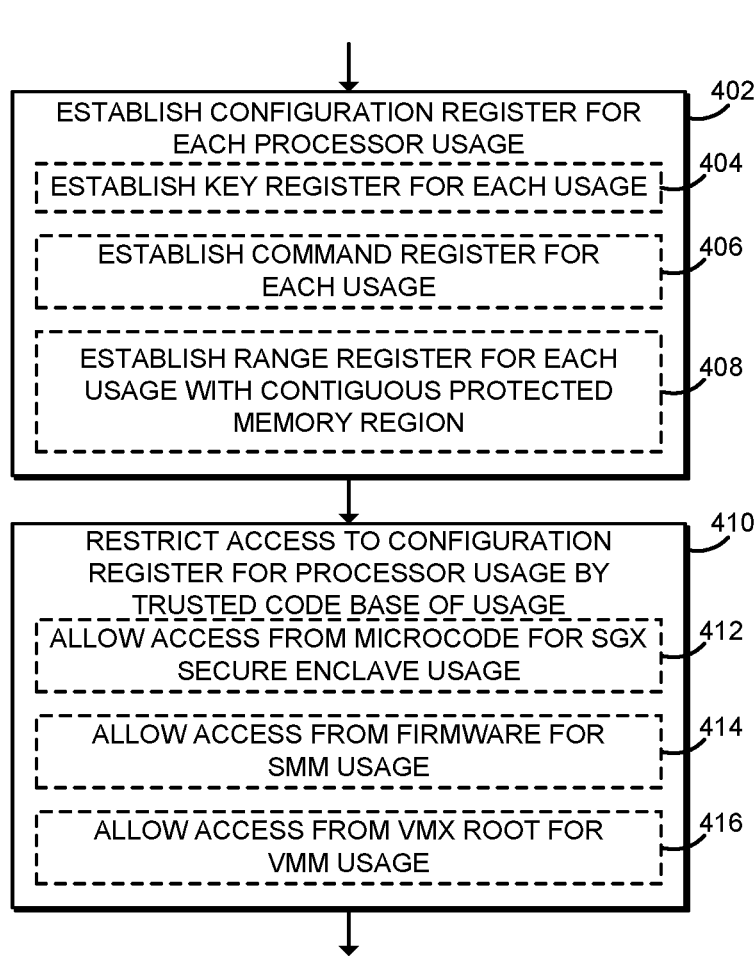
FIG. 4 is a simplified flow diagram of at least one embodiment of a method for configuration register access control that may be executed by the memory encryption engine of the computing device of FIGS. 1-2.

Referring now to FIG. 4, in use, the computing device 100 may execute a method 400 for configuration register access control. The method 400 may be executed, for example, in connection with configuration of the MEE 124 as described above in connection with block 302 of FIG. 3. It should be appreciated that, in some embodiments, the operations of the method 400 may be performed by one or more components of the MEE 124 of the computing device 100, for example as shown in FIG. 2. The method 400 begins with block 402, in which the MEE 124 establishes a configuration register 214 for each processor usage 202. In block 404, the computing device 100 may establish a key register 218 for each usage 202. In block 406, the computing device 100 may establish a command register 220 for each usage 202. In block 408, the method computing 100 may establish a range register 216 for each usage 202 with a contiguous protected memory region.

In block 410, the MEE 124 restricts access to the configuration registers 214 by the trusted code base (TCB) of the associated usage 202. For example, each register 214 (e.g., range register 216, key register 218, and/or command register 220) may allow access by a particular policy group of the processor 120 for the associated usage 202. In some embodiments, in block 412, the MEE 124 may allow access from processor microcode or trusted DFx agents for the secure enclave usage 204. In that example, the processor 120 (and therefore the microcode) is within the TCB of the secure enclave usage 204. In some embodiments, in block 414 the MEE 124 may allow access from system firmware (e.g., BIOS or UEFI firmware) for the SMM usage 206. In that example, BIOS is within the TCB of the SMM usage 206, and thus BIOS is allowed to write to the associated key registers 218. In some embodiments, in block 416 the MEE 124 may allow access from VMX-root mode of the processor 120 for the VMM usage 208. In that example, the key registers 218 may be exposed to the VMM in the MMIO space, which the VMM virtualizes to prevent access by other entities. After restricting access, the method 400 is complete. The computing device 100 may continue to configure the processor usage 202 and/or other processor usages 202.

Figure 5:
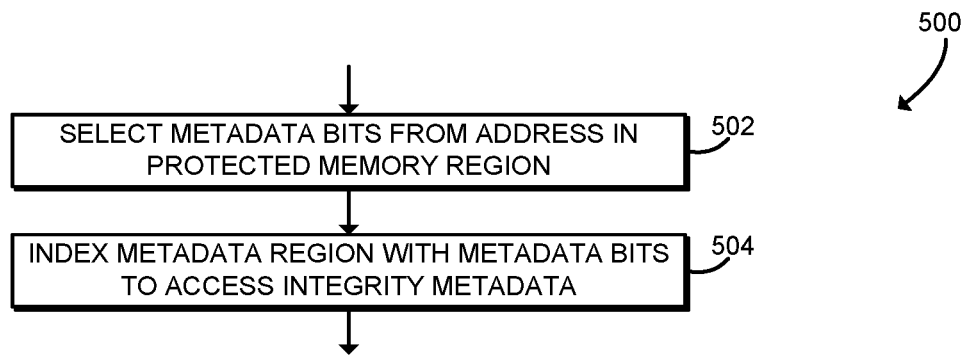
FIG. 5 is a simplified flow diagram of at least one embodiment of a method for integrity metadata address generation that may be executed by the memory encryption engine of the computing device of FIGS. 1-2.

Referring now to FIG. 5, in use, the computing device 100 may execute a method 500 for integrity metadata address generation. The method 500 may be executed by the MEE 124 to verify and/or update integrity metadata stored in a metadata region, for example as described above in connection with blocks 322, 326 of FIG. 3. It should be appreciated that, in some embodiments, the operations of the method 500 may be performed by one or more components of the MEE 124 of the computing device 100, for example as shown in FIG. 2. The method 500 begins with block 502, in which the MEE 124 selects metadata bits from a memory address in the protected memory region. In block 504, the MEE 124 indexes a metadata memory region with the metadata bits to access integrity metadata associated with the memory address in the protected memory region. The integrity metadata may include, for example, MAC nodes, counter nodes, and/or intermediate metadata nodes of an integrity tree that are associated with the memory address in the protected memory region. The MEE 124 may generate the metadata address using only the memory address, without requiring additional indirection.

For example, in some embodiments the computing device 100 may establish one or more protected memory regions that are 32 megabytes in size and discontiguous in memory. A memory location within the protected memory region may be identified by a 39-bit memory address. The lowest-order 6 bits of the address may be a cacheline offset, used to identify a particular byte in a 64-byte cache line. The top 14 bits of the address may be used to locate the protected memory region in the memory 128. The middle 19 bits of the memory address are the metadata bits, and may be used by the MEE 124 to index the metadata region and access integrity metadata. The VMM usage 208 or other discontiguous memory range usage 202 has the responsibility to pick locations in memory 128 for the protected memory range to avoid collisions and to ensure that unique indexes are used. Additionally, although illustrated with a 32 megabyte protected memory region, it should be appreciated that any size protected memory region may be used, and the number of metadata bits depends on the size of the protected memory region.

Figure 6:
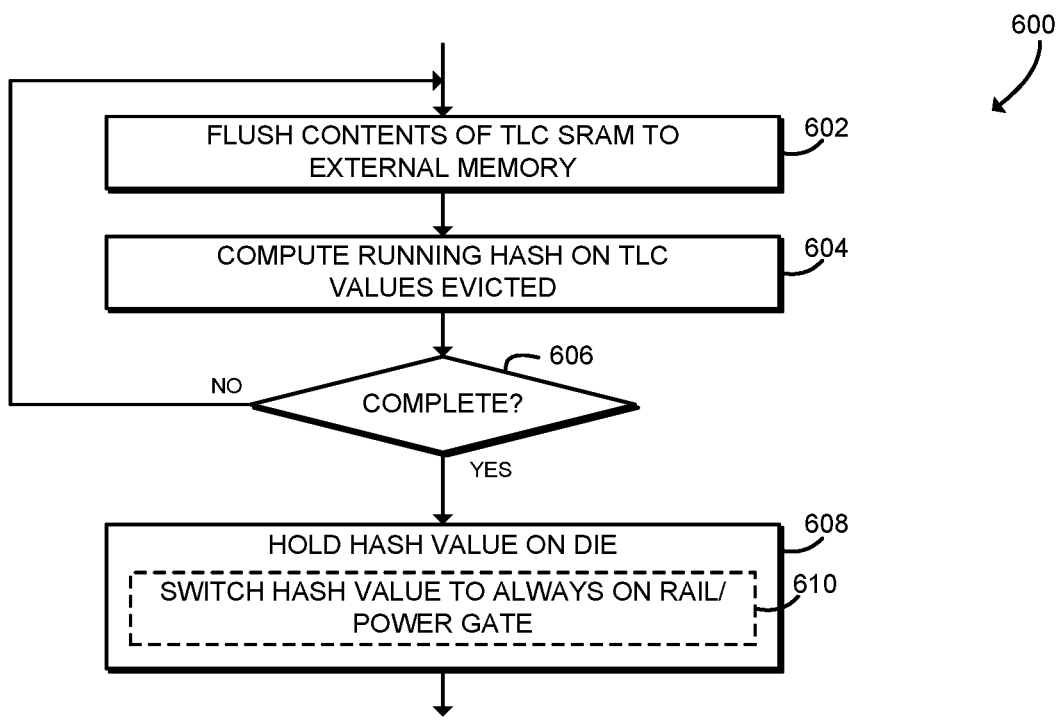
FIG. 6 is a simplified flow diagram of at least one embodiment of a method for entering a low-power state that may be executed by the memory encryption engine of the computing device of FIGS. 1-2.

Referring now to FIG. 6, in use, the computing device 100 may execute a method 600 for entering a low-power state. The method 600 may be executed by the MEE 124, for example, as described above in connection with block 330 of FIG. 3. It should be appreciated that, in some embodiments, the operations of the method 600 may be performed by one or more components of the MEE 124 of the computing device 100, for example as shown in FIG. 2. The method 600 begins with block 602, in which the MEE 124 flushes the contents of the TLC memory 226 to the external memory device 128. In block 604, the MEE 124 computes a running hash over the values of the TLC memory 226 as they are evicted. In block 606, the MEE 124 determines whether flushing the TLC memory 226 is complete. If not, the method 600 loops back to block 602 to continue flushing the contents of the TLC memory 226. If complete, the method 600 advances to block 608.

In block 608, the MEE 124 holds the computed running hash value on the die of the MEE 124. For example, the hash value may be stored in a register or other data storage of the MEE 124. After being held in the die, the hash value is preserved when the computing device 100 is put in a low-power state such as S3 sleep. In some embodiments, in block 610, the MEE 124 switches the hash value to an always-on rail, power gate, or other always-on power domain of the MEE 124. After holding the hash value, the method 600 is complete and the computing device 100 may enter the low-power state. In particular, the TLC memory 226 may be powered down or otherwise placed in a low-power state. The TLC memory 226 may be significantly larger than the stored hash value, and thus powering down the TLC memory 226 may provide significant power savings. For example, in some embodiments, the TLC memory 226 may include 4 kilobytes of data for each processor usage 202, while the stored hash may include 128 bits of data or other relatively small amount of data.

Figure 7:
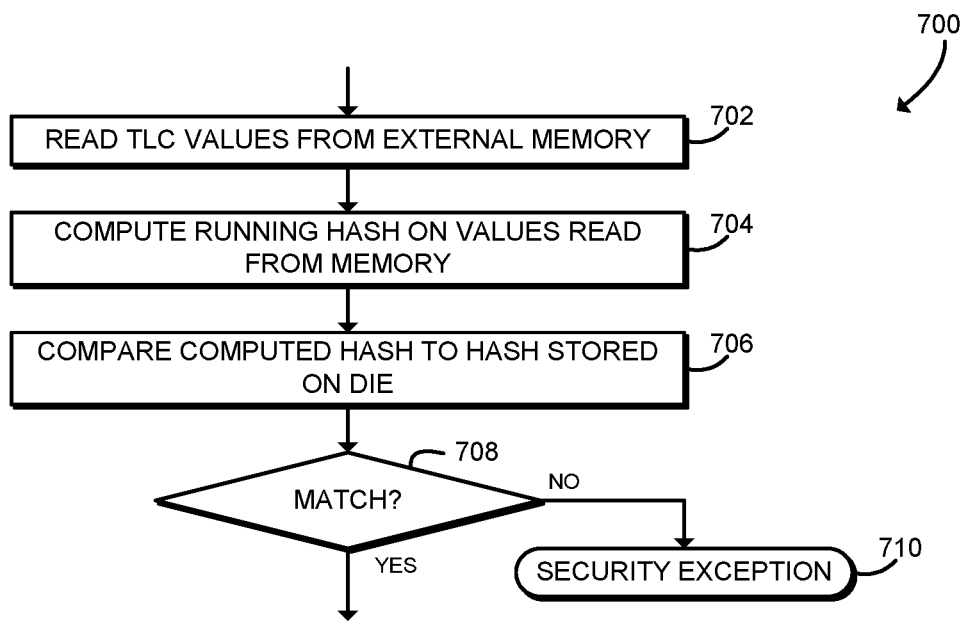
FIG. 7 is a simplified flow diagram of at least one embodiment of a method for exiting the low-power state that may be executed by the memory encryption engine of the computing device of FIGS. 1-2.

Referring now to FIG. 7, in use, the computing device 100 may execute a method 700 for exiting a low-power state. The method 700 may be executed by the MEE 124, for example, as described above in connection with block 332 of FIG. 3. It should be appreciated that, in some embodiments, the operations of the method 700 may be performed by one or more components of the MEE 124 of the computing device 100, for example as shown in FIG. 2. The method 700 begins with block 702, in which the MEE 124 reads TLC counter values from the external memory 128 into the on-die TLC memory 226. The TLC counter values may have been stored previously by the MEE 124, for example as described above in connection with FIG. 6.

In block 704, the MEE 124 computes a running hash on the TLC values read from the memory 128. In block 706, the MEE 124 compares the computed hash value to the hash value stored on the die of the MEE 124. The hash value may have been stored on die as described above in connection with FIG. 6. In block 708, the MEE 124 determines whether the computed hash value matches the hash value stored on die. If not, the method 700 branches to block 710, in which the MEE 124 generates a security exception. The MEE 124 may halt execution of the computing device 100, generate an alert, or otherwise indicate that a security exception has occurred. Referring back to block 708, if the computed hash value matches the hash value stored on die, the method 700 is completed. The computing device 100 may continue to execute the processor usage 202 with confidentiality, integrity, and replay protection provided by the MEE 124.

It should be appreciated that, in some embodiments, the methods 300, 400, 500, 600, and/or 700 may be embodied as various instructions stored on a computer-readable media, which may be executed by the processor 120, the MEE 124, the I/O subsystem 126, and/or other components of the computing device 100 to cause the computing device 100 to perform the corresponding method 300, 400, 500, 600, and/or 700. The computer-readable media may be embodied as any type of media capable of being read by the computing device 100 including, but not limited to, the memory 128, the data storage device 130, microcode of the processor 120, and/or other media.

EXAMPLES

Illustrative examples of the technologies disclosed herein are provided below. An embodiment of the technologies may include any one or more, and any combination of, the examples described below.

Example 1 includes a computing device for secure memory usage, the computing device comprising: a processor that includes a memory encryption engine, wherein the processor supports a plurality of processor usages; a memory device coupled to the processor; and configuration logic to configure the memory encryption engine to protect a first memory region for a first processor usage of the plurality of processor usages, wherein the first memory region is stored by the memory device; wherein the processor is to execute the first processor usage in response to configuration of the memory encryption engine; and wherein the memory encryption engine is to protect contents of the first memory region in response to execution of the first processor usage.

Example 2 includes the subject matter of Example 1, and wherein: to configure the memory encryption engine comprises to write a configuration value to a configuration register of the memory encryption engine, wherein the configuration register is associated with the first processor usage; and the memory encryption engine is to restrict access to the configuration register to a trusted code base of the first processor usage.

Example 3 includes the subject matter of any of Examples 1 and 2, and wherein the configuration register comprises a key register, a range register, or a command register.

Example 4 includes the subject matter of any of Examples 1-3, and wherein: the first processor usage comprises a secure enclave usage; and to restrict access to the configuration register to the trusted code base comprises to restrict access to the configuration register to microcode of the processor.

Example 5 includes the subject matter of any of Examples 1-4, and wherein: the first processor usage comprises a system management mode usage; and to restrict access to the configuration register to the trusted code base comprises to restrict access to the configuration register to firmware executed by the processor.

Example 6 includes the subject matter of any of Examples 1-5, and wherein: the first processor usage comprises a virtual machine monitor usage; and to restrict access to the configuration register to the trusted code base comprises to restrict access to the configuration register to a virtualization root mode of the processor.

Example 7 includes the subject matter of any of Examples 1-6, and wherein the first processor usage comprises a processor mode of the processor.

Example 8 includes the subject matter of any of Examples 1-7, and wherein to protect the contents of the first memory region comprises to: select, by the memory encryption engine, a plurality of metadata bits from a first memory address in the first memory region; and index, by the memory encryption engine, a metadata memory region with the metadata bits to retrieve an integrity tree metadata value.

Example 9 includes the subject matter of any of Examples 1-8, and wherein to protect the contents of the first memory region comprises to: intercept, by the memory encryption engine, a memory request from the first processor usage to the first memory address in the first protected memory region; and verify, by the memory encryption engine, the encrypted data at the first memory address using the integrity tree metadata value in response to interception of the memory request.

Example 10 includes the subject matter of any of Examples 1-9, and wherein: the memory request comprises a read request; and to protect the contents of the first memory region further comprises to decrypt, by the memory encryption engine, encrypted data at the first memory address in response to the interception of the read request.

Example 11 includes the subject matter of any of Examples 1-10, and wherein: the memory request comprises a write request; and to protect the contents of the first memory region further comprises to: (i) encrypt, by the memory encryption engine, plain text data to generate updated encrypted data, (ii) write, by the memory encryption engine, the updated encrypted data at the first memory address in response to verification of the encrypted data, and (iii) update, by the memory encryption engine, the integrity tree metadata value in the metadata memory region based on the updated encrypted data.

Example 12 includes the subject matter of any of Examples 1-11, and wherein: the memory encryption engine is further to: write contents of a top-level counter memory of the memory encryption engine to the memory device, wherein the top-level counter memory comprises integrity tree metadata for the first memory region; compute a running hash value of the contents of the top-level counter memory in response to writing the top-level counter memory to the memory device; and hold the running hash value in an always-on power domain of the memory encryption engine; and the computing device further comprises power management logic to enter a low-power state in response to a holding of the running hash value.

Example 13 includes the subject matter of any of Examples 1-12, and wherein: the power management logic is further to exit the low-power state; and the memory encryption engine is further to: read the contents of the top-level counter memory of the memory encryption engine from the memory device in response to an exit of the low-power state; compute a test hash value of the contents of the top-level counter memory in response to reading of the contents; and determine whether the test hash value matches the running hash value held in the always-on power domain.

Example 14 includes the subject matter of any of Examples 1-13, and wherein the memory encryption engine is further to generate a security exception in response to a determination that the test hash value does not match the running hash value.

Example 15 includes a method for secure memory usage, the method comprising: configuring, by a computing device, a memory encryption engine of a processor of the computing device to protect a first memory region for a first processor usage of a plurality of processor usages supported by the processor, wherein the first memory region is stored by a memory device coupled to the processor; executing, by the computing device, the first processor usage in response to configuring the memory encryption engine; and protecting, by the memory encryption engine, contents of the first memory region in response to executing the first processor usage.

Example 16 includes the subject matter of Example 15, and wherein configuring the memory encryption engine comprises: writing a configuration value to a configuration register of the memory encryption engine, wherein the configuration register is associated with the first processor usage; and restricting, by the memory encryption engine, access to the configuration register to a trusted code base of the first processor usage.

Example 17 includes the subject matter of any of Examples 15 and 16, and wherein the configuration register comprises a key register, a range register, or a command register.

Example 18 includes the subject matter of any of Examples 15-17, and wherein: the first processor usage comprises a secure enclave usage; and restricting access to the configuration register to the trusted code base comprises restricting access to the configuration register to microcode of the processor.

Example 19 includes the subject matter of any of Examples 15-18, and wherein: the first processor usage comprises a system management mode usage; and restricting access to the configuration register to the trusted code base comprises restricting access to the configuration register to firmware executed by the processor.

Example 20 includes the subject matter of any of Examples 15-19, and wherein: the first processor usage comprises a virtual machine monitor usage; and restricting access to the configuration register to the trusted code base comprises restricting access to the configuration register to a virtualization root mode of the processor.

Example 21 includes the subject matter of any of Examples 15-20, and wherein the first processor usage comprises a processor mode of the processor.

Example 22 includes the subject matter of any of Examples 15-21, and wherein protecting the contents of the first memory region comprises: selecting, by the memory encryption engine, a plurality of metadata bits from a first memory address in the first memory region; and indexing, by the memory encryption engine, a metadata memory region with the metadata bits to retrieve an integrity tree metadata value.

Example 23 includes the subject matter of any of Examples 15-22, and wherein protecting the contents of the first memory region comprises: intercepting, by the memory encryption engine, a memory request from the first processor usage to the first memory address in the first protected memory region; and verifying, by the memory encryption engine, the encrypted data at the first memory address using the integrity tree metadata value in response to intercepting the memory request.

Example 24 includes the subject matter of any of Examples 15-23, and wherein: the memory request comprises a read request; and protecting the contents of the first memory region further comprises decrypting, by the memory encryption engine, encrypted data at the first memory address in response to intercepting the read request.

Example 25 includes the subject matter of any of Examples 15-24, and wherein: the memory request comprises a write request; and protecting the contents of the first memory region further comprises: (i) encrypting, by the memory encryption engine, plain text data to generate updated encrypted data, (ii) writing, by the memory encryption engine, the updated encrypted data at the first memory address in response to verifying the encrypted data, and (iii) updating, by the memory encryption engine, the integrity tree metadata value in the metadata memory region based on the updated encrypted data.

Example 26 includes the subject matter of any of Examples 15-25, and further comprising: writing, by the memory encryption engine, contents of a top-level counter memory of the memory encryption engine to the memory device, wherein the top-level counter memory comprises integrity tree metadata for the first memory region; computing, by the memory encryption engine, a running hash value of the contents of the top-level counter memory in response to writing the top-level counter memory to the memory device; holding, by the memory encryption engine, the running hash value in an always-on power domain of the memory encryption engine; and entering, by the computing device, a low-power state in response to holding the running hash value.

Example 27 includes the subject matter of any of Examples 15-26, and further comprising: exiting, by the computing device, the low-power state; reading, by the memory encryption engine, the contents of the top-level counter memory of the memory encryption engine from the memory device in response to exiting the low-power state; computing, by the memory encryption engine, a test hash value of the contents of the top-level counter memory in response to reading the contents; and determining, by the memory encryption engine, whether the test hash value matches the running hash value held in the always-on power domain.

Example 28 includes the subject matter of any of Examples 15-27, and further comprising generating, by the memory encryption engine, a security exception in response to determining that the test hash value does not match the running hash value.

Example 29 includes a computing device comprising: a processor; and a memory having stored therein a plurality of instructions that when executed by the processor cause the computing device to perform the method of any of Examples 15-28.

Example 30 includes one or more non-transitory, computer readable storage media comprising a plurality of instructions stored thereon that in response to being executed result in a computing device performing the method of any of Examples 15-28.

Example 31 includes a computing device comprising means for performing the method of any of Examples 15-28.

Example 32 includes a computing device for secure memory usage, the computing device comprising: means for configuring a memory encryption engine of a processor of the computing device to protect a first memory region for a first processor usage of a plurality of processor usages supported by the processor, wherein the first memory region is stored by a memory device coupled to the processor; means for executing the first processor usage in response to configuring the memory encryption engine; and means for protecting, by the memory encryption engine, contents of the first memory region in response to executing the first processor usage.

Example 33 includes the subject matter of Example 32, and wherein the means for configuring the memory encryption engine comprises: means for writing a configuration value to a configuration register of the memory encryption engine, wherein the configuration register is associated with the first processor usage; and means for restricting, by the memory encryption engine, access to the configuration register to a trusted code base of the first processor usage.

Example 34 includes the subject matter of any of Examples 32 and 33, and wherein the configuration register comprises a key register, a range register, or a command register.

Example 35 includes the subject matter of any of Examples 32-34, and wherein: the first processor usage comprises a secure enclave usage; and the means for restricting access to the configuration register to the trusted code base comprises means for restricting access to the configuration register to microcode of the processor.

Example 36 includes the subject matter of any of Examples 32-35, and wherein: the first processor usage comprises a system management mode usage; and the means for restricting access to the configuration register to the trusted code base comprises means for restricting access to the configuration register to firmware executed by the processor.

Example 37 includes the subject matter of any of Examples 32-36, and wherein: the first processor usage comprises a virtual machine monitor usage; and the means for restricting access to the configuration register to the trusted code base comprises means for restricting access to the configuration register to a virtualization root mode of the processor.

Example 38 includes the subject matter of any of Examples 32-37, and wherein the first processor usage comprises a processor mode of the processor.

Example 39 includes the subject matter of any of Examples 32-38, and wherein the means for protecting the contents of the first memory region comprises: means for selecting, by the memory encryption engine, a plurality of metadata bits from a first memory address in the first memory region; and means for indexing, by the memory encryption engine, a metadata memory region with the metadata bits to retrieve an integrity tree metadata value.

Example 40 includes the subject matter of any of Examples 32-39, and wherein the means for protecting the contents of the first memory region comprises: means for intercepting, by the memory encryption engine, a memory request from the first processor usage to the first memory address in the first protected memory region; and means for verifying, by the memory encryption engine, the encrypted data at the first memory address using the integrity tree metadata value in response to intercepting the memory request.

Example 41 includes the subject matter of any of Examples 32-40, and wherein: the memory request comprises a read request; and the means for protecting the contents of the first memory region further comprises means for decrypting, by the memory encryption engine, encrypted data at the first memory address in response to intercepting the read request.

Example 42 includes the subject matter of any of Examples 32-41, and wherein: the memory request comprises a write request; and the means for protecting the contents of the first memory region further comprises: (i) means for encrypting, by the memory encryption engine, plain text data to generate updated encrypted data, (ii) means for writing, by the memory encryption engine, the updated encrypted data at the first memory address in response to verifying the encrypted data, and (iii) updating, by the memory encryption engine, the integrity tree metadata value in the metadata memory region based on the updated encrypted data.

Example 43 includes the subject matter of any of Examples 32-42, and further comprising: means for writing, by the memory encryption engine, contents of a top-level counter memory of the memory encryption engine to the memory device, wherein the top-level counter memory comprises integrity tree metadata for the first memory region; means for computing, by the memory encryption engine, a running hash value of the contents of the top-level counter memory in response to writing the top-level counter memory to the memory device; means for holding, by the memory encryption engine, the running hash value in an always-on power domain of the memory encryption engine; and means for entering a low-power state in response to holding the running hash value.

Example 44 includes the subject matter of any of Examples 32-43, and further comprising: means for exiting the low-power state; means for reading, by the memory encryption engine, the contents of the top-level counter memory of the memory encryption engine from the memory device in response to exiting the low-power state; means for computing, by the memory encryption engine, a test hash value of the contents of the top-level counter memory in response to reading the contents; and means for determining, by the memory encryption engine, whether the test hash value matches the running hash value held in the always-on power domain.

Example 45 includes the subject matter of any of Examples 32-44, and further comprising means for generating, by the memory encryption engine, a security exception in response to determining that the test hash value does not match the running hash value.

The invention claimed is:

1. A computing device for secure memory usage, the computing device comprising:
   a processor that includes a memory encryption engine, wherein the processor supports a plurality of processor usages;
   a memory device coupled to the processor; and
   configuration logic to configure the memory encryption engine to protect a first memory region for a first processor usage of the plurality of processor usages, wherein the first memory region is stored by the memory device, and wherein to configure the memory encryption engine comprises to write a configuration value to a configuration register of the memory encryption engine, wherein the configuration register is associated with the first processor usage;
   wherein the processor is to execute the first processor usage in response to configuration of the memory encryption engine; and
   wherein the memory encryption engine is to (i) protect contents of the first memory region in response to execution of the first processor usage and (ii) restrict access to the configuration register to a trusted code base of the first processor usage.

2. The computing device of claim 1, wherein the configuration register comprises a key register, a range register, or a command register.

3. The computing device of claim 1, wherein:
the first processor usage comprises a secure enclave usage; and
to restrict access to the configuration register to the trusted code base comprises to restrict access to the configuration register to microcode of the processor.

4. The computing device of claim 1, wherein:
the first processor usage comprises a system management mode usage; and
to restrict access to the configuration register to the trusted code base comprises to restrict access to the configuration register to firmware executed by the processor.

5. The computing device of claim 1, wherein:
the first processor usage comprises a virtual machine monitor usage; and
to restrict access to the configuration register to the trusted code base comprises to restrict access to the configuration register to a virtualization root mode of the processor.

6. The computing device of claim 1, wherein to protect the contents of the first memory region comprises to:
select, by the memory encryption engine, a plurality of metadata bits from a first memory address in the first memory region; and
index, by the memory encryption engine, a metadata memory region with the metadata bits to retrieve an integrity tree metadata value.

7. The computing device of claim 6, wherein to protect the contents of the first memory region comprises to:
intercept, by the memory encryption engine, a memory request from the first processor usage to the first memory address in the first protected memory region; and
verify, by the memory encryption engine, the encrypted data at the first memory address using the integrity tree metadata value in response to interception of the memory request.

8. The computing device of claim 7, wherein:
the memory request comprises a read request; and
to protect the contents of the first memory region further comprises to decrypt, by the memory encryption engine, encrypted data at the first memory address in response to the interception of the read request.

9. The computing device of claim 7, wherein:
the memory request comprises a write request; and
to protect the contents of the first memory region further comprises to: (i) encrypt, by the memory encryption engine, plain text data to generate updated encrypted data, (ii) write, by the memory encryption engine, the updated encrypted data at the first memory address in response to verification of the encrypted data, and (iii) update, by the memory encryption engine, the integrity tree metadata value in the metadata memory region based on the updated encrypted data.

10. The computing device of claim 1, wherein:
the memory encryption engine is further to:
write contents of a top-level counter memory of the memory encryption engine to the memory device, wherein the top-level counter memory comprises integrity tree metadata for the first memory region;
compute a running hash value of the contents of the top-level counter memory in response to writing the top-level counter memory to the memory device; and
hold the running hash value in an always-on power domain of the memory encryption engine; and the computing device further comprises power management logic to enter a low-power state in response to a holding of the running hash value.

11. The computing device of claim 10, wherein:
the power management logic is further to exit the low-power state; and
the memory encryption engine is further to:
read the contents of the top-level counter memory of the memory encryption engine from the memory device in response to an exit of the low-power state;
compute a test hash value of the contents of the top-level counter memory in response to reading of the contents; and
determine whether the test hash value matches the running hash value held in the always-on power domain.

12. The computing device of claim 11, wherein the memory encryption engine is further to generate a security exception in response to a determination that the test hash value does not match the running hash value.

13. A method for secure memory usage, the method comprising:
configuring, by a computing device, a memory encryption engine of a processor of the computing device to protect a first memory region for a first processor usage of a plurality of processor usages supported by the processor, wherein the first memory region is stored by a memory device coupled to the processor;
executing, by the computing device, the first processor usage in response to configuring the memory encryption engine; and
protecting, by the memory encryption engine, contents of the first memory region in response to executing the first processor usage;
wherein configuring the memory encryption engine comprises: (i) writing a configuration value to a configuration register of the memory encryption engine, wherein the configuration register is associated with the first processor usage and (ii) restricting, by the memory encryption engine, access to the configuration register to a trusted code base of the first processor usage.

14. The method of claim 13, wherein protecting the contents of the first memory region comprises:
selecting, by the memory encryption engine, a plurality of metadata bits from a first memory address in the first memory region; and
indexing, by the memory encryption engine, a metadata memory region with the metadata bits to retrieve an integrity tree metadata value.

15. The method of claim 14, wherein protecting the contents of the first memory region comprises:
intercepting, by the memory encryption engine, a memory request from the first processor usage to the first memory address in the first protected memory region; and
verifying, by the memory encryption engine, the encrypted data at the first memory address using the integrity tree metadata value in response to intercepting the memory request.

16. The method of claim 13, further comprising:
writing, by the memory encryption engine, contents of a top-level counter memory of the memory encryption engine to the memory device, wherein the top-level counter memory comprises integrity tree metadata for the first memory region;
computing, by the memory encryption engine, a running hash value of the contents of the top-level counter memory in response to writing the top-level counter memory to the memory device;

holding, by the memory encryption engine, the running hash value in an always-on power domain of the memory encryption engine; and entering, by the computing device, a low-power state in response to holding the running hash value.

17. The method of claim 16, further comprising:

exiting, by the computing device, the low-power state;

reading, by the memory encryption engine, the contents of the top-level counter memory of the memory encryption engine from the memory device in response to exiting the low-power state;

computing, by the memory encryption engine, a test hash value of the contents of the top-level counter memory in response to reading the contents; and determining, by the memory encryption engine, whether the test hash value matches the running hash value held in the always-on power domain.

18. One or more non-transitory, computer-readable storage media comprising a plurality of instructions stored thereon that, in response to being executed, cause a computing device to:

configure a memory encryption engine of a processor of the computing device to protect a first memory region for a first processor usage of a plurality of processor usages supported by the processor, wherein the first memory region is stored by a memory device coupled to the processor;

execute the first processor usage in response to configuring the memory encryption engine; and protect, by the memory encryption engine, contents of the first memory region in response to executing the first processor usage;

wherein to configure the memory encryption engine comprises to: (i) write a configuration value to a configuration register of the memory encryption engine, wherein the configuration register is associated with the first processor usage and (ii) restrict, by the memory encryption engine, access to the configuration register to a trusted code base of the first processor usage.

19. The one or more non-transitory, computer-readable storage media of claim 18, wherein to protect the contents of the first memory region comprises to:

select, by the memory encryption engine, a plurality of metadata bits from a first memory address in the first memory region; and index, by the memory encryption engine, a metadata memory region with the metadata bits to retrieve an integrity tree metadata value.

20. The one or more non-transitory, computer-readable storage media of claim 19, wherein to protect the contents of the first memory region comprises to:

intercept, by the memory encryption engine, a memory request from the first processor usage to the first memory address in the first protected memory region; and verify, by the memory encryption engine, the encrypted data at the first memory address using the integrity tree metadata value in response to intercepting the memory request.

21. The one or more non-transitory, computer-readable storage media of claim 18, further comprising a plurality of instructions stored thereon that, in response to being executed, cause the computing device to:

write, by the memory encryption engine, contents of a top-level counter memory of the memory encryption engine to the memory device, wherein the top-level counter memory comprises integrity tree metadata for the first memory region;

compute, by the memory encryption engine, a running hash value of the contents of the top-level counter memory in response to writing the top-level counter memory to the memory device;

hold, by the memory encryption engine, the running hash value in an always-on power domain of the memory encryption engine; and enter a low-power state in response to holding the running hash value.

22. The one or more non-transitory, computer-readable storage media of claim 21, further comprising a plurality of instructions stored thereon that, in response to being executed, cause the computing device to:

exit the low-power state;

read, by the memory encryption engine, the contents of the top-level counter memory of the memory encryption engine from the memory device in response to exiting the low-power state;

compute, by the memory encryption engine, a test hash value of the contents of the top-level counter memory in response to reading the contents; and determine, by the memory encryption engine, whether the test hash value matches the running hash value held in the always-on power domain.

* * * * *